United States Patent [19]
Hausdorf et al.

[11] Patent Number: 5,158,984
[45] Date of Patent: Oct. 27, 1992

[54] METHOD OF RECOVERING POLYVINYL CHLORIDE FROM SOLVENT-CONTAINING WASTE PVC PASTES

[75] Inventors: Jörg Hausdorf, Fürth; Bardo Anselm, Laudenbach; Steffen Kosack, Hassloch; Peter Schäfer, Heiligkreuzsteinach; Rolf Schneider, Bensheim-Zell; Stefan Seiderer, Gorxheimertal, all of Fed. Rep. of Germany

[73] Assignee: Carl Freudenberg, Weinheim/Bergstr., Fed. Rep. of Germany

[21] Appl. No.: 859,896

[22] Filed: Mar. 30, 1992

[30] Foreign Application Priority Data

Apr. 24, 1991 [DE] Fed. Rep. of Germany ....... 4113336

[51] Int. Cl.$^5$ .......................... C08J 11/06; C08J 11/08
[52] U.S. Cl. ..................................................... 521/46.5
[58] Field of Search .......................................... 521/46.5

[56] References Cited

U.S. PATENT DOCUMENTS

| | | | |
|---|---|---|---|
| 3,912,664 | 10/1975 | Wainer | 521/46.5 |
| 4,031,039 | 6/1977 | Mizumoto et al. | 521/46.5 |
| 4,038,219 | 7/1977 | Boehm | 521/46.5 |
| 4,071,479 | 1/1978 | Broyde et al. | 521/46.5 |
| 5,022,985 | 6/1991 | Nugent | 521/46.5 |

*Primary Examiner*—Morton Foelak
*Attorney, Agent, or Firm*—Felfe & Lynch

[57] ABSTRACT

Reuseable polyvinyl chloride is recovered from solvent-loaded waste polyvinyl chloride paste by adding one twentieth of the paste weight of an acyl polyethylene glycol ester, then adding about twice the paste weight of water, while stirring, driving off the solvent by steam distillation, separating the solvent from the resulting two-phase distillate, and filtering off and drying the polyvinyl chloride granules floating in water left behind in the distillation residue.

1 Claim, No Drawings

METHOD OF RECOVERING POLYVINYL CHLORIDE FROM SOLVENT-CONTAINING WASTE PVC PASTES

FIELD OF THE INVENTION

This invention relates to a novel method of recovering polyvinyl chloride from solvent-containing waste PVC pastes. Free of solvents, these pastes are useful for the production of synthetics for use in the automotive, shoe and leather goods industries as sheet material for making purses, luggage, car seats or shoe upper material, for example.

BACKGROUND OF THE INVENTION

In addition to polyvinyl chloride, PVC pastes contain plasticizers, filler, pigments, stabilizers and fire retardants. The pastes are delivered to the processing station by pumps and pipelines. In the event of a production changeover, these pumps and pipelines can be cleared of PVC-containing residues having a lacquer-like to pasty consistency only by means of a solvent, preferably an aromatic gasoline. The solvent-containing waste pastes thus obtained usually have a solids content of about 60% by weight and must be processed under sub-contract in special plants by distilling out the solvent, whereby, depending upon the residual solvent content, a highly viscous or crusty, bubble-filled residue is obtained which has to be disposed of as special waste material. There is no known way of modifying the recovery process so that the residues can be used over again.

OBJECTS OF THE INVENTION

It is an object of the present invention to provide a process for recovering polyvinyl chloride from waste PVC pastes regardless of their consistency, that is, also from those of lacquer-like consistency, in a manner so that the residual components are reuseable and no longer constitute special waste materials.

Other objects and advantages of the present invention will become apparent as the description thereof proceeds.

DESCRIPTION OF THE INVENTION

We have discovered that the above object is achieved by treating the solvent-containing waste PVC paste, which usually has a dry weight of around 60%, with a noninic acyl polyethylene glycol ester emulsifier, such as EMULAN ® EL available from BASF, in a weight ratio of 20 parts paste per 1 part emulsifier. Such emulsifiers are commercially available and are specifically intended for the preparation of emulsions of fatty acids, fatty oils, organic solvents and organic substances dissolved therein. No information is given about the behavior of such emulsions, especially about the separability of their components.

For the present invention it is necessary that the dry weight of 60 wt.–% of the solvent containing waste paste be maintained within ±10%. However, this condition can easily be checked or corrected, if necessary, prior to subjecting the paste to the treatment according to the present invention.

The specified weight ratio of emulsifier to paste determines the particle size of the free-floating PVC granules at the end of the process. A low emulsifier ratio such as 1:20 results in very coarse granules with solvent inclusions, and a higher emulsifier ratio produces very fine granules which cause problems during filtration.

After addition of the emulsifier, an amount by weight of water corresponding to twice the original weight of the paste is added. The solvent is then driven out of the resulting emulsion by means of a conventional steam distillation. This procedure is the carrier vapor distillation well known in chemical technology, that is, distillation with steam as the carrier. It makes it possible to distill high-boiling-point liquids which are immiscible or only sparsely miscible with water at 98° to 100° C. The vapor pressure of the hot steam adds itself to the relatively low vapor pressure of the liquid to be distilled.

The distillate obtained thereby consists of a solvent phase and a water phase. These are separated from one another by decantation or siphoning. The solvent is so pure that it can be reused immediately. In some case drying over a granular drying agent is necessary, which can be accomplished with the aid of calcium chloride or a molecular sieve.

The distillation residue is a fine-grained polyvinyl chloride granulate, which has a particle size of 200 to 2000 $\mu$m, floating in water. The granulate is filtered off by means of a suitable porous belt filter and is then dried on a porous belt dryer or in a drying oven.

The recovered solids can be disposed of in a dump as "plastic wastes of various kinds" or can be reused without further treatment as regenerated polyvinyl chloride for the production of injection-molded articles, such as garbage pails or other hollow wares, vibration dampers for railroad rails, noiseproofing of walls, or floor covering for indoor horseback riding rinks.

Without the water/emulsifier addition under otherwise identical conditions, only a very crusty or, in the case of a higher residual solvent content, a very viscous residue is obtained which must be classed as special waste.

The method of the present invention also makes it possible to regenerate in an environmentally acceptable manner waste polyvinyl chloride pastes which do not originate from pump cleaning but have also had to be disposed of as special waste. Such solvent-free pastes need only to be treated with the appropriate solvents, for example with an aromatic gasoline, in a weight ratio of 1 part solvent to 20 parts paste, and can then be processed according to the present invention like the above mentioned pump and pipeline residues.

The following Example illustrates the present invention and will enable others skilled in the art to understand it more completely. It should be understood, however, that the invention is not limited solely to the particular Example given below.

EXAMPLE 100 parts by weight of solvent-containing waste PVC paste (dry weight about 60%) were admixed with 5 parts by weight of EMULAN ® EL, and the mixture was transferred to a three-neck flask connected to a distillation column. Thereafter, 200 parts by weight of water were added to the mixture while stirring. The solvent was driven out of the resulting emulsion at a temperature of 98° to 100° C. with the aid of steam generated by a laboratory steam generator. The distillation was complete after 2 to 3 hours. The distillate thus obtained was a two-phase system consisting of a solvent phase and a water phase. These two phases were separated by means of a phase separator. The solvent phase, after drying it over calcium chloride or passing it through a molecular sieve, was pure enough to use it again for the purpose of clearing pumps and pipelines of PVC-containing residues. The residue remaining in the flask was a fine-grained PVC granulate floating in water. The granulate was filtered off and dried in a drying oven. Yield of PVC granulate: 100% (based on the dry weight). The dry granulate could be disposed of in an environmentally safe manner as waste plastic, or it could be used without further treatment as regenerated polyvinyl chloride for the manufacture of plastic articles.

Without the addition of water and emulsifier, but under otherwise identical conditions, only a highly viscous or very crusty residue was left behind in the flask, depending upon the amount of solvent contained in the waste PVC paste. This residue had to be disposed of as special waste material.

While the present invention has been illustrated with the aid of certain specific embodiments thereof, it will be readily apparent to others skilled in the art that the invention is not limited to these particular embodiments, and that various changes and modifications may be made without departing from the spirit of the invention or the scope of the appended claims.

We claim:

1. A method for recovering polyvinyl chloride from solvent-containing waste polyvinyl chloride pastes by removal of the solvent from the paste by distillation, which comprises adjusting the solvent-containing waste polyvinyl chloride paste to a dry weight of about 60%, adding thereto an acyl polyethylene glycol ester emulsifier in a weight ratio of 1 part ester to 20 parts waste paste, adding to the resulting emulsion an amount of water corresponding to twice the weight of the original paste while stirring, driving the solvent out of the emulsion by steam distillation, separating the water phase from the resulting two-phase water/solvent distillate, and filtering off and drying the fine-grained polyvinyl chloride granulate floating in water which remains behind in the distillation residue.

* * * * *